United States Patent
Summers

(10) Patent No.: US 9,430,695 B2
(45) Date of Patent: *Aug. 30, 2016

(54) DETERMINING WHICH PARTICIPANT IS SPEAKING IN A VIDEOCONFERENCE

(71) Applicant: Citrix Systems, Inc., Fort Lauderdale, FL (US)

(72) Inventor: Jacob Jared Summers, Coral Springs, FL (US)

(73) Assignee: Citrix Systems, Inc., Ford Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,498

(22) Filed: Jun. 16, 2015

(65) Prior Publication Data

US 2015/0310260 A1   Oct. 29, 2015

Related U.S. Application Data

(63) Continuation of application No. 13/647,205, filed on Oct. 8, 2012, now Pat. No. 9,076,028.

(51) Int. Cl.
*H04N 7/14* (2006.01)
*G06K 9/00* (2006.01)
(Continued)

(52) U.S. Cl.
CPC ....... *G06K 9/00281* (2013.01); *G06K 9/00221* (2013.01); *G06K 9/00228* (2013.01); *G06K 9/00711* (2013.01); *G06K 9/6255* (2013.01); *H04N 7/15* (2013.01)

(58) Field of Classification Search
CPC .............. G06K 9/00228; G06K 9/00221; G06K 9/6255; G06K 9/00335; G06F 3/017; G06F 3/048; G06F 3/04883; H04N 7/14; H04N 7/15; A01B 12/006

USPC ........ 348/14.07, 14.08, 14.1, 14.12; 382/118
See application file for complete search history.

(56) References Cited

U.S. PATENT DOCUMENTS 5,625,704 A   4/1997 Prasad
6,532,373 B1  3/2003 Jouin
(Continued)

FOREIGN PATENT DOCUMENTS

AU   2008264173 A1   7/2010
EP      1739966 A1   1/2007

OTHER PUBLICATIONS

Polycom CX5000 HD Unified Conference Station; http://www.polycom.com/products/voice/conferencing solutions/microsoft optimized conferencing/CX5000 html; downloaded Oct. 5, 2012; 2 pages.

(Continued)

*Primary Examiner* — Binh Tieu
(74) *Attorney, Agent, or Firm* — BainwoodHuang

(57) ABSTRACT

Aspects herein describe methods and systems of receiving, by one or more cameras, images in which the images comprise facial images of individuals. Aspects of the disclosure describe extracting the facial images from the images received, sorting the extracted facial images into separate groups wherein each group corresponds to the facial images of each individual, and selecting, for each individual, a preferred facial image from each group. The preferred facial images selected are transmitted to a client for display. Aspects of the disclosure also describe selecting either a facial recognition algorithm or an audio triangulation algorithm to use to determine which individual is speaking wherein the selection is based on whether lip movement of one or more of the individuals is visible in the images received from the cameras.

18 Claims, 12 Drawing Sheets

(51) Int. Cl.
*H04N 7/15* (2006.01)
*G06K 9/62* (2006.01)

(56) References Cited

U.S. PATENT DOCUMENTS

| | | |
|---|---|---|
| 8,027,521 B1 | 9/2011 | Moon et al. |
| 8,379,937 B1 | 2/2013 | Moon et al. |
| 2007/0279483 A1 | 12/2007 | Beers et al. |
| 2008/0084429 A1 | 4/2008 | Wissinger |
| 2008/0088698 A1 | 4/2008 | Patel et al. |
| 2008/0298571 A1* | 12/2008 | Kurtz ............... H04N 7/142 379/156 |
| 2009/0202114 A1* | 8/2009 | Morin ............... A63F 13/12 382/118 |
| 2010/0079573 A1* | 4/2010 | Isaac ............... H04M 1/72552 348/14.01 |
| 2010/0123770 A1* | 5/2010 | Friel ............... H04N 7/15 348/14.08 |
| 2010/0205667 A1* | 8/2010 | Anderson ............... G06F 3/013 726/19 |
| 2010/0332229 A1 | 12/2010 | Aoyama et al. |
| 2012/0321145 A1 | 12/2012 | Saito et al. |
| 2012/0327174 A1 | 12/2012 | Hines et al. |
| 2012/0327177 A1* | 12/2012 | Kee ............... H04N 7/15 348/14.08 |
| 2013/0271559 A1 | 10/2013 | Feng et al. |

OTHER PUBLICATIONS

Aug. 29, 2014—(PCT) International Search Report and Written Opinion—App PCT/US2013/060610.

* cited by examiner

Selected Facial Images Obtained From
Field of View as seen from Camera 204

Selected Facial Images Obtained From
Field of View as seen from Camera 205

Selected Facial Images Obtained From
Field of View as seen from Camera 206

DETERMINING WHICH PARTICIPANT IS SPEAKING IN A VIDEOCONFERENCE

CROSS-REFERENCE TO RELATED APPLICATION

This application is a continuation of U.S. patent application Ser. No. 13/647,205 entitled "Facial Recognition and Transmission of Facial Images in a Video Conference" and filed on Oct. 8, 2012 which is incorporated by reference herein in its entirety.

TECHNICAL FIELD

Aspects described herein relate to the capture, processing, and transmission of facial images of one or more persons in a room.

BACKGROUND

When a videoconference meeting occurs between parties, it is often difficult to determine who is speaking. Often, the face of a speaker may be blocked by another person in the same room given the seating arrangement of the room. Furthermore, the size of the facial images may be different in size depending on each person's distance from a camera that is capturing the videoconference. In addition, depending on the camera's field of view, the faces of one or more speakers may be obscured resulting in difficulty determining exactly who is doing the talking. Moreover, the angle in which the camera captures the facial images of the participants in the videoconference may result in undesirable side or rear head shots of one or more participants of a videoconference. Therefore, the video transmitted to the other party may provide little or no information with regard to the person who is speaking.

During the videoconference, the facial expression and lip movements of a speaker or presenter may be partially or entirely not visible. These facial expressions and lip movements determine the person who is speaking and may be helpful in better understanding the speaker words and his expressions as he speaks. Furthermore, a speaker's facial expression may also provide an understanding of the emotional content of his presentation (e.g., whether the speaker is happy, angered, sad, excited, for example). Thus, communication between parties over a videoconference call may suffer without being able to view the facial images of the speakers.

Furthermore, if a speaker should move behind another person in a room within a camera's field of view, the camera may be unable to continue to capture the image of the speaker. Thus, in this instance, the speaker may entirely disappear from the videoconference and the speaker's lip movements may be unable to be captured by the camera.

Thus, based on the foregoing, there exists a need to provide a better way to capture, process, and transmit a view of facial images in a videoconference call from one party to one or more other parties.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects of illustrative aspects herein describe new methods and systems for capturing, processing, and transmitting facial images of participants from a host to a client.

The various aspects of the illustrative embodiments are substantially shown in and/or described in connection with at least one of the following figures, as set forth more completely in the claims.

These and other advantages, aspects, and novel features of the present disclosure, as well as details of illustrated embodiments, thereof, will be more fully understood from the following description and drawings.

BRIEF DESCRIPTION OF THE DRAWINGS

Figure 1A:
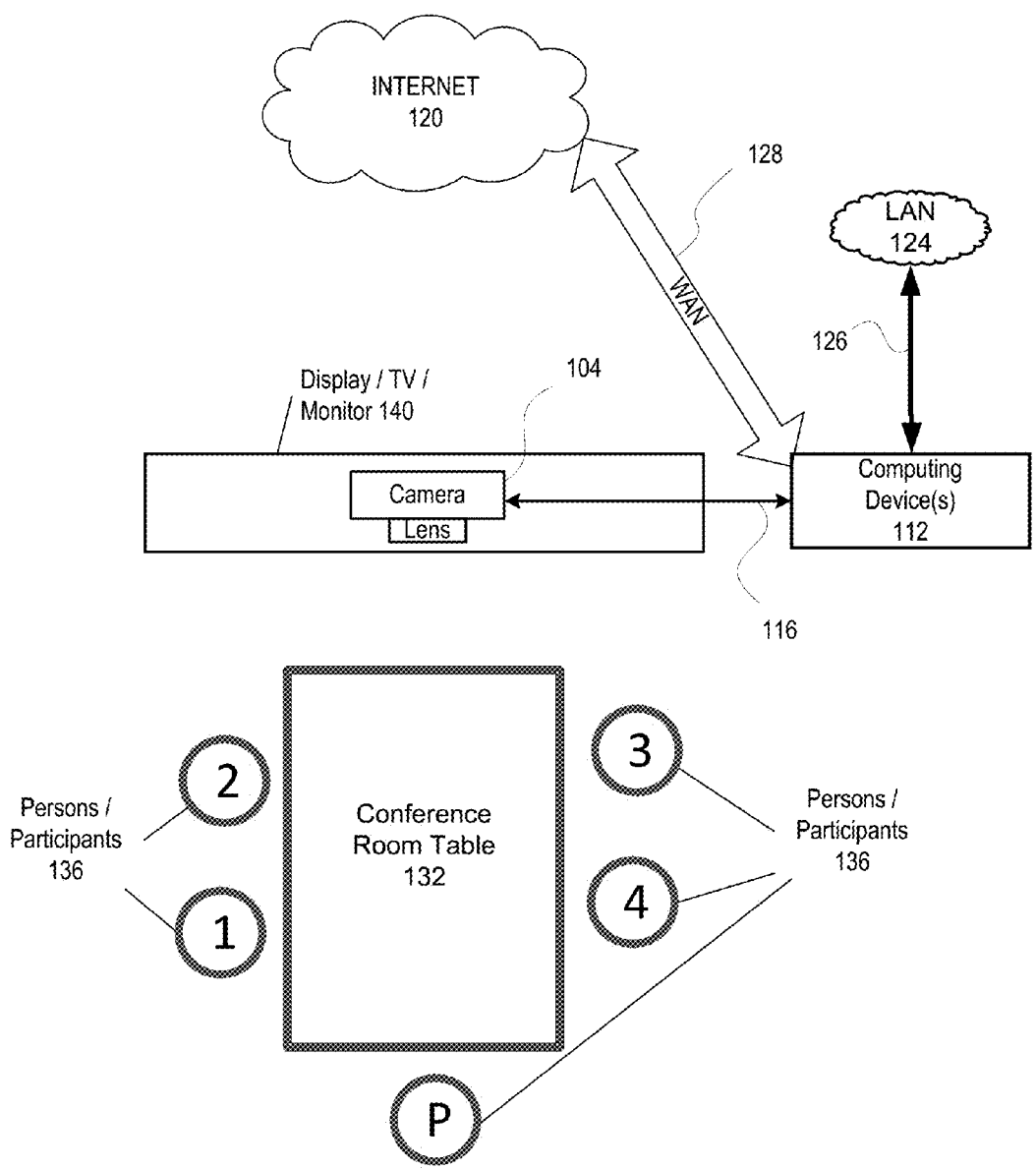

Having thus described aspects of the disclosure in general terms, reference will now be made to the accompanying drawings, which are not necessarily drawn to scale, and wherein:

FIG. 1A illustrates an operating environment in which various aspects of the disclosure may be implemented.

Figure 1B:
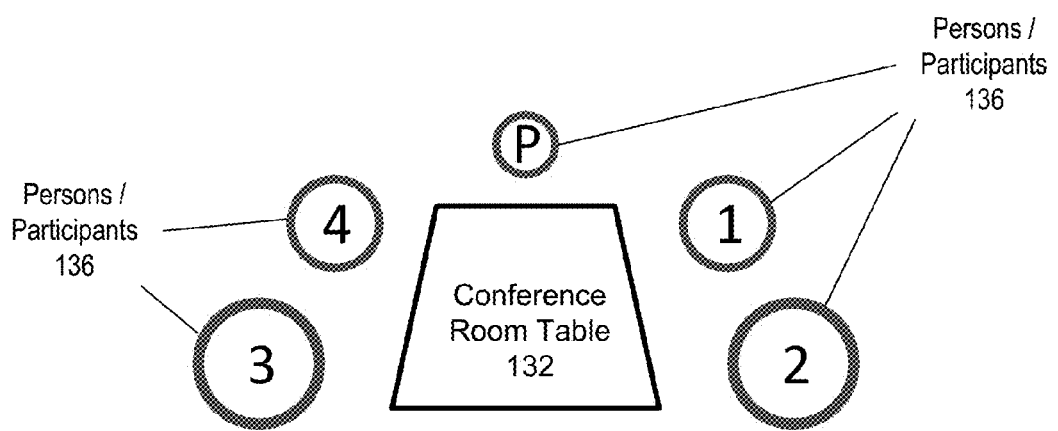

FIG. 1B illustrates a field of view from a camera's perspective in accordance with the illustrative operating environment shown in FIG. 1A.

Figure 1C:
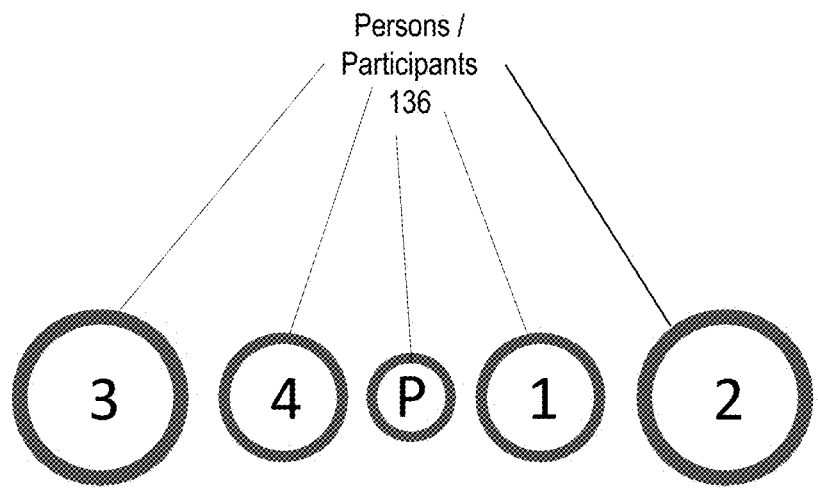

FIG. 1C illustrates the recognition or detection of facial images within the image captured by the camera in accordance with the illustrative operating environment shown in FIG. 1A.

Figure 1D:
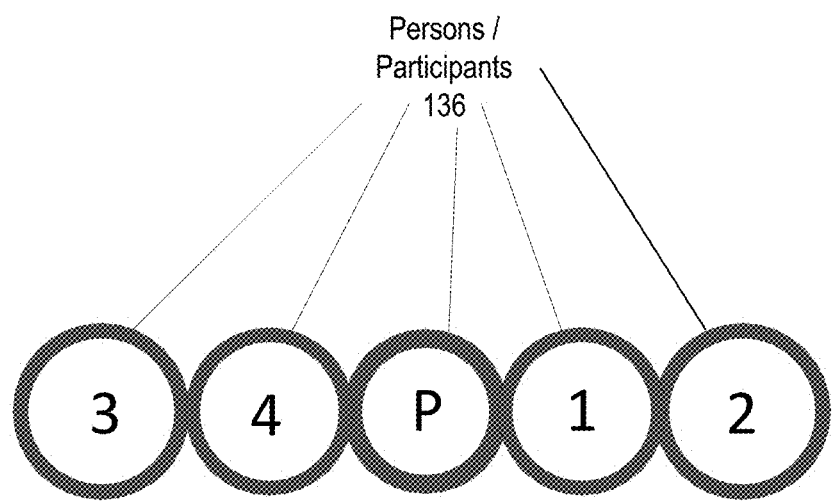

FIG. 1D illustrates facial images of participants after their facial images have been normalized in accordance with the illustrative operating environment shown in FIG. 1A.

Figure 1E:
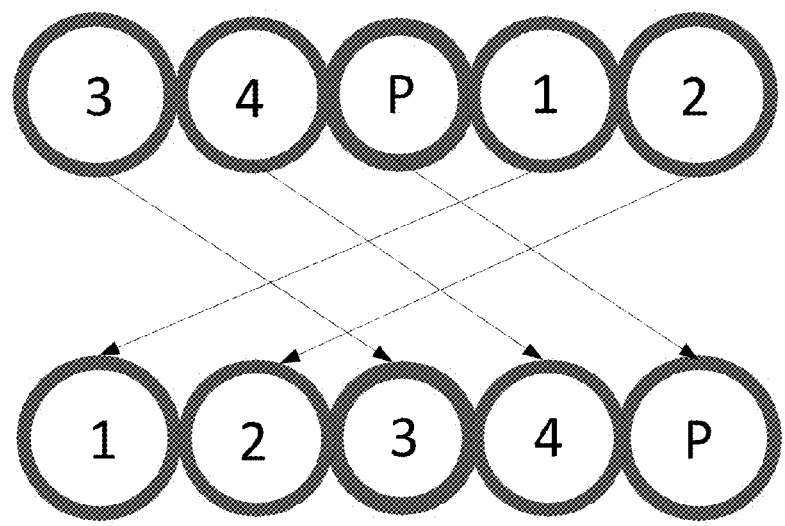

FIG. 1E illustrates collating and/or sorting of normalized facial images of participants in accordance with the illustrative operating environment shown in FIG. 1A.

Figure 1F:
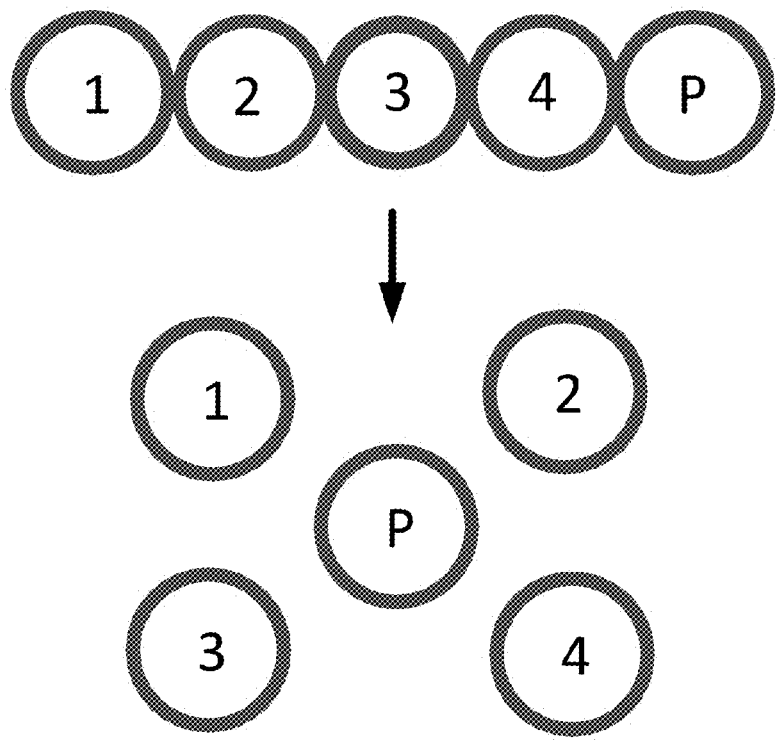

FIG. 1F illustrates the positioning or arranging of normalized facial images of participants into an output grid pattern in accordance with the illustrative operating environment shown in FIG. 1A.

Figure 2A:
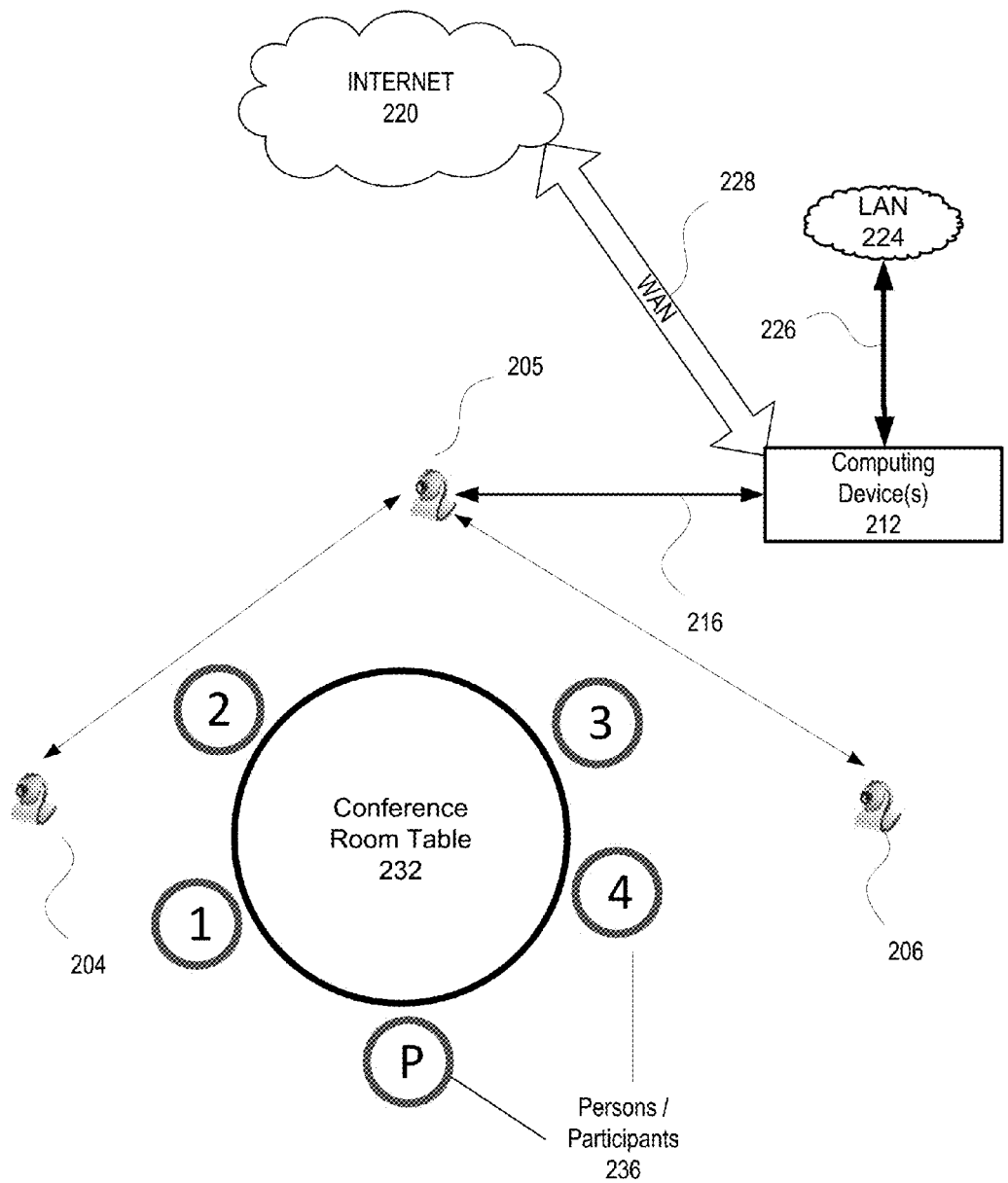

FIG. 2A illustrates an example operating environment in which various aspects of the disclosure may be implemented.

Figure 2B:
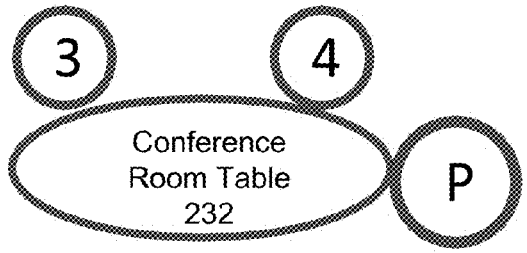

FIG. 2B illustrates the facial images collected from the image captured by the first camera in accordance with the illustrative operating environment shown in FIG. 2A.

Figure 2C:
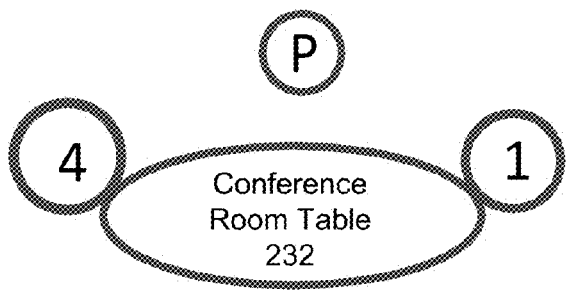

FIG. 2C illustrates the facial images collected from the image captured by the second camera in accordance with the illustrative operating environment shown in FIG. 2A.

Figure 2D:
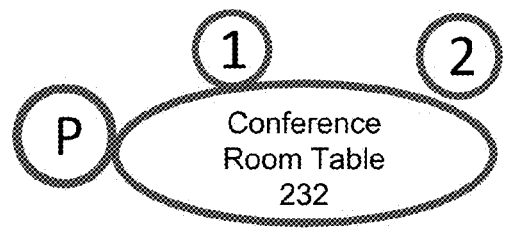

FIG. 2D illustrates the facial images collected from the image captured by the third camera in accordance with the illustrative operating environment shown in FIG. 2A.

Figure 2E:

FIG. 2E illustrates the normalization of the selected facial images captured by the first camera in accordance with the illustrative operating environment shown in FIG. 2A.

Figure 2F:

FIG. 2F illustrates the normalization of the selected facial images captured by the second camera in accordance with the illustrative operating environment shown in FIG. 2A.

Figure 2G:
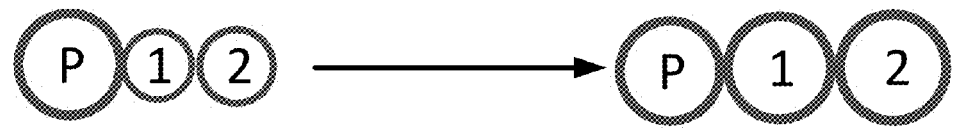

FIG. 2G illustrates the normalization of the selected facial images captured by the camera third in accordance with the illustrative operating environment shown in FIG. 2A.

Figure 2H:
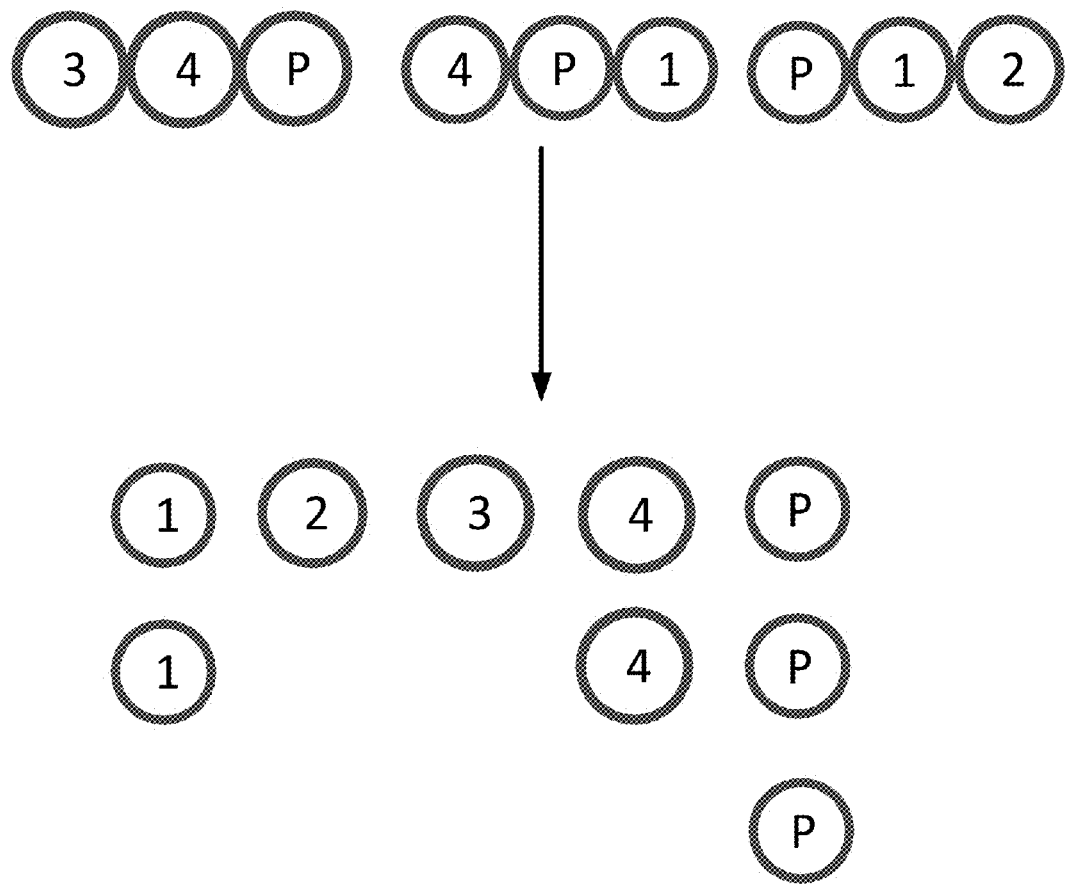

FIG. 2H illustrates sorting and processing of the facial images captured by each of the cameras in accordance with the illustrative operating environment shown in FIG. 2A.

Figure 2I:
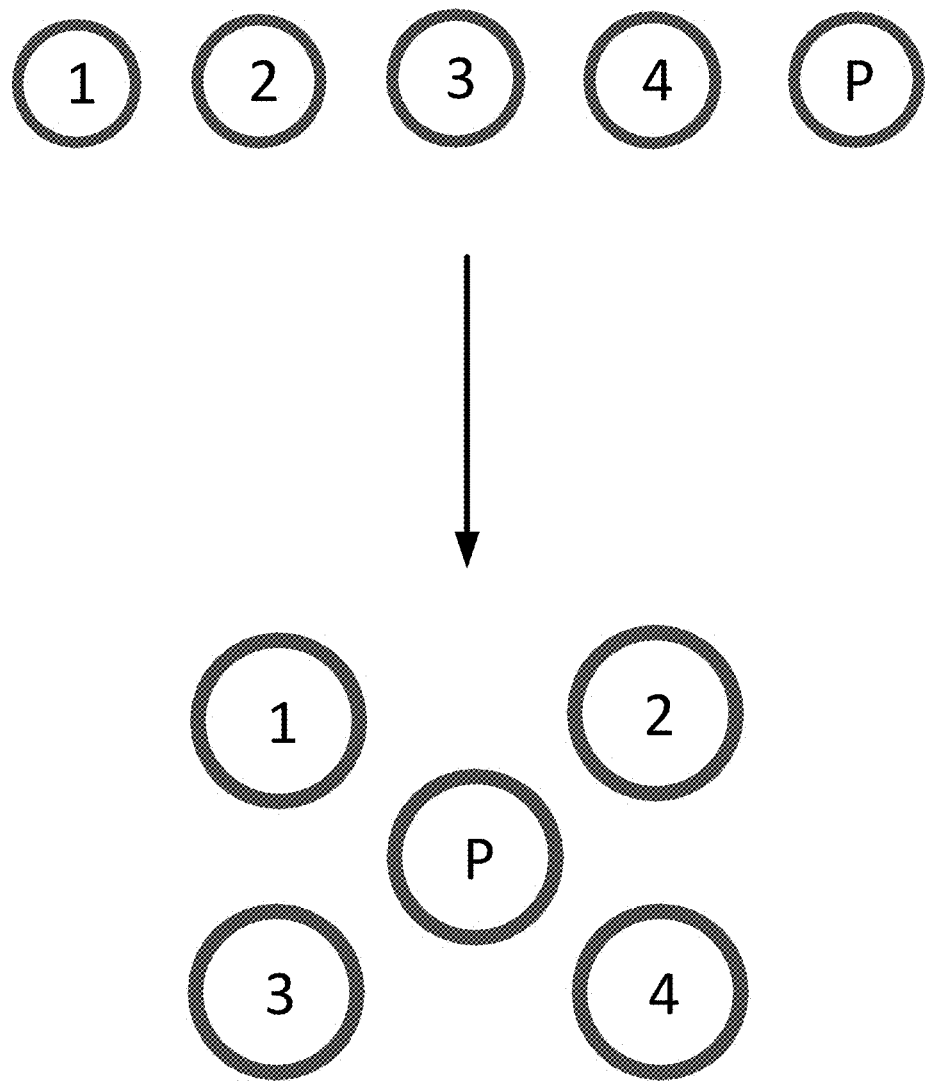

FIG. 2I illustrates the positioning or arranging of normalized facial images of participants into spatial pattern in accordance with the illustrative operating environment shown in FIG. 2A.

Figure 2J:
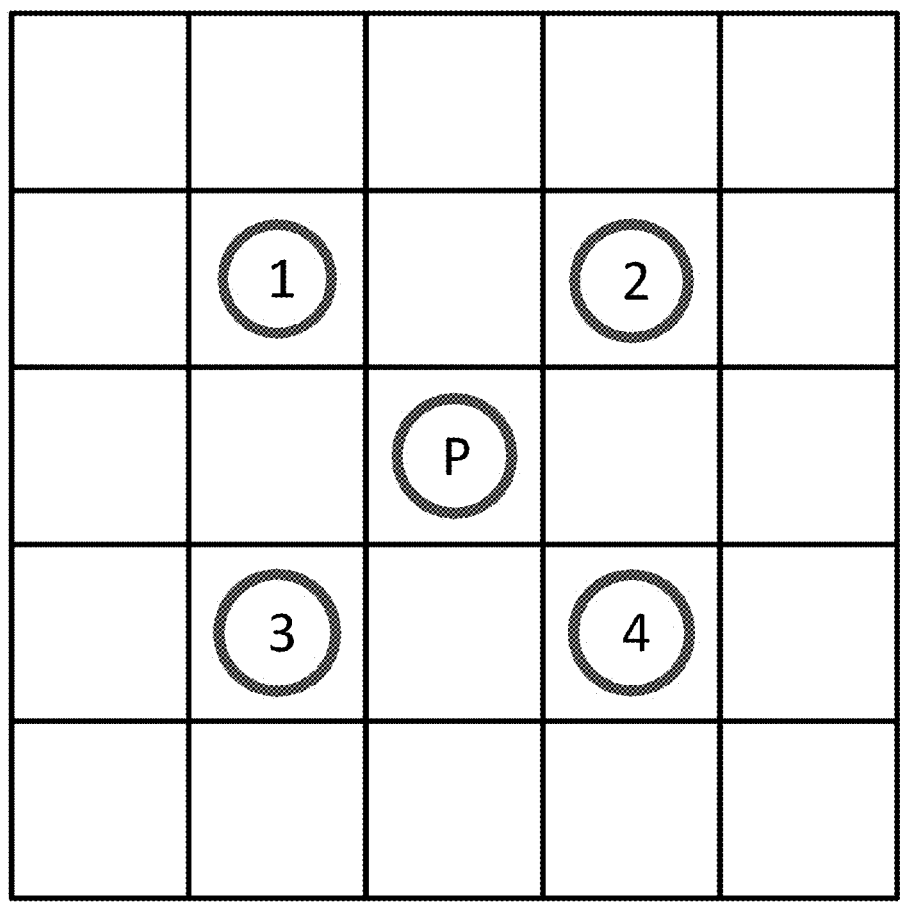

FIG. 2J illustrates the positioning or arranging of normalized facial images of participants into an output grid pattern in accordance with the illustrative operating environment shown in FIG. 2A.

Figure 3:
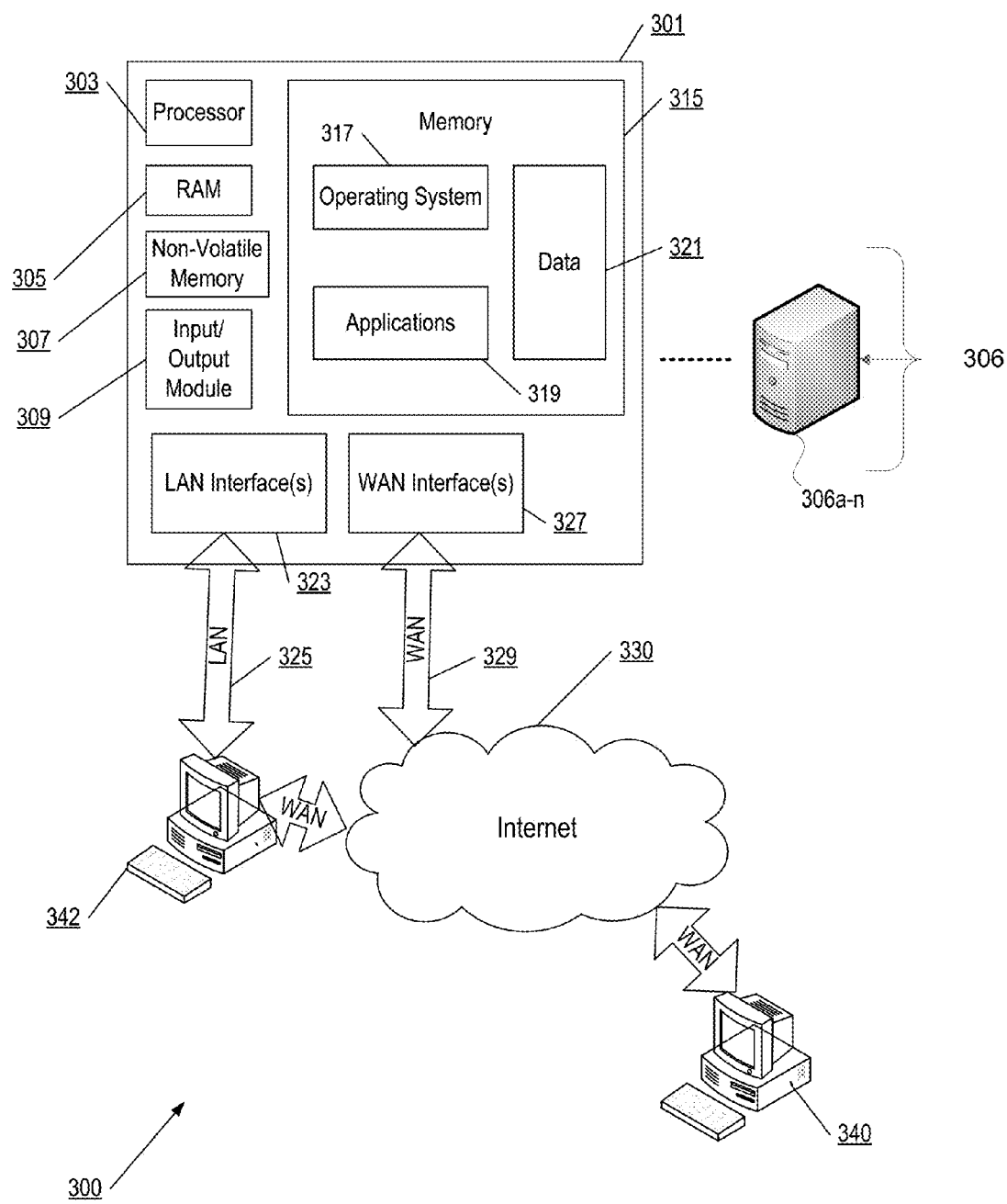

FIG. 3 illustrates an example block diagram of a generic computing device corresponding to each of the computing devices shown in connection with each of FIGS. 1A and 2A according to one or more illustrative embodiments of the disclosure.

Figure 4:
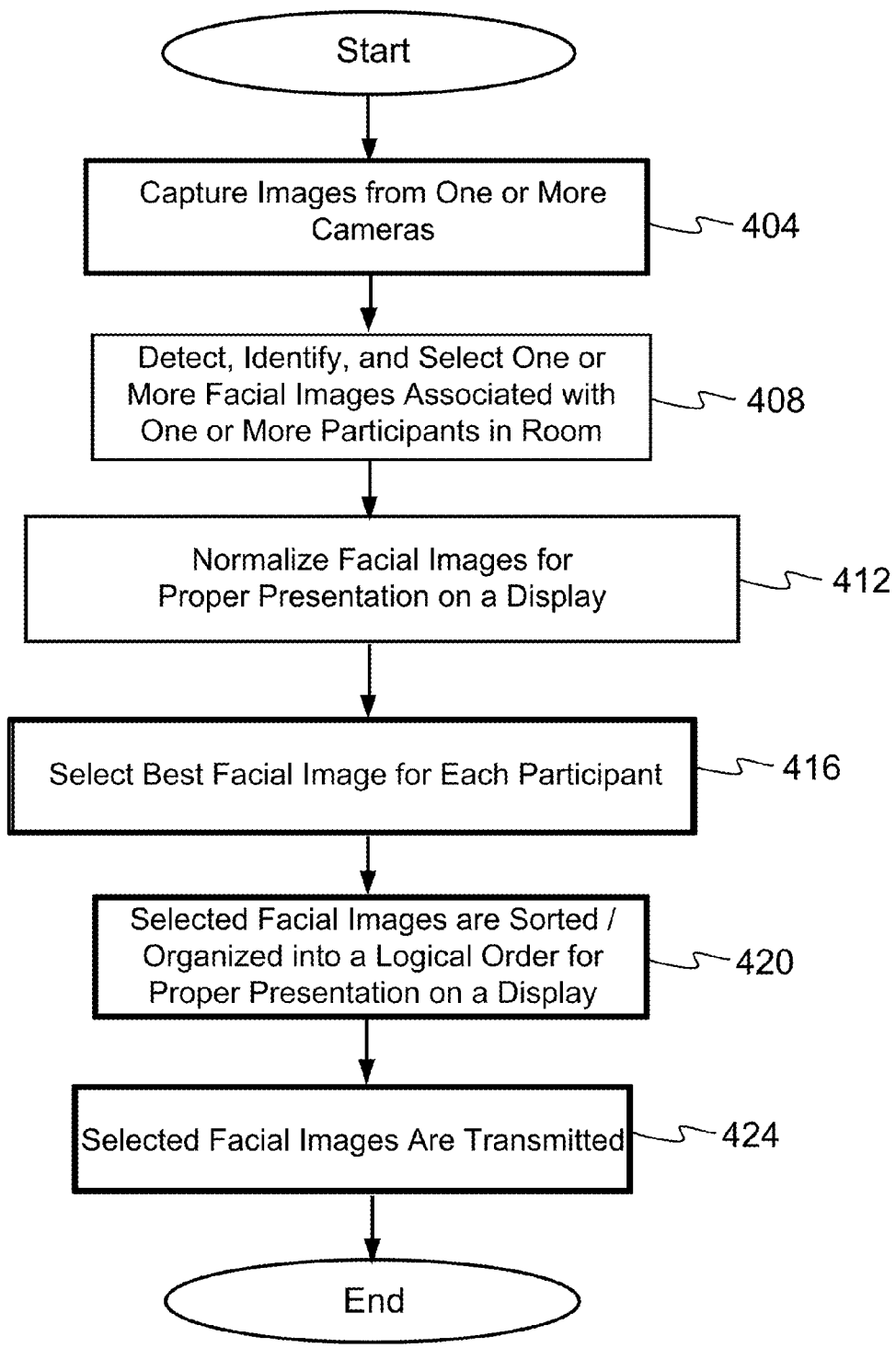

FIG. 4 is an operational flow diagram illustrating how one or more cameras, at a host, capture, process, and transmit one or more facial images to a client in accordance with an illustrative embodiment of the disclosure.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system or apparatus, or a computer program product. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including magnetic hard disk drives, optical discs such as CDs and DVDs, and/or other optical media or optical drives, NAS (network attached storage) devices, and/or any combination thereof. In addition, various signals, such as one or more digital signals, may comprise data (uncoded, coded, or encrypted) that may be transmitted between computing devices. The computing devices may comprise one or more computers (e.g., PC, desktop computer, laptop computer), one or more portable wireless computing devices (e.g., a wireless phone, PDA, laptop computer, notepad), or any kind of computing device comprising a processor and memory which is capable of executing firmware and/or software.

FIG. 1A illustrates an example operating environment in which various aspects of the disclosure may be implemented. The operating environment includes one or more persons/participants 136, situated around a conference room table 132, a display/television/monitor 140, a camera 104, a computing device 112, a local area network (LAN) 124, a wide area network (WAN) 128, and the Internet 120. While FIG. 1A illustrates a single computing device 112, in other embodiments, the single computing device 112 may be replaced by two or more computing devices working cooperatively to provide the functions described herein. The exemplary embodiment illustrates a view from the top of the operating environment. In this exemplary embodiment, the camera 104 is positioned on top of the display 140 as shown although it may be positioned anywhere in front of the participants. The camera 104 may be positioned at a suitable height to allow for a clear view of the faces of all participants 136. The camera 140 may be positioned at a height which provides a downward field of view of the participants in a room. In an alternate embodiment, the display 140 may comprise the camera 104. The camera 140 may be integrated into the display 140. In this embodiment, a single camera 140 may be used because the participants are positioned to face the camera 140 as they view the display. The single camera 140 is capable of providing a field of view that captures the facial images of all participants. The field of view and angle of view of the camera 140 may be adjusted to capture all the participants in the room.

The camera 104 is communicatively coupled to the computing device 112 by a communication link 116. The communication link 116 may comprise a wired connector which may be configured to transmit and receive signals that comply with the following hard-wired protocols: versions of USB, Firewire (IEEE 1394), Ethernet (versions of IEEE 802.3), or any other wired protocol. Alternatively, the communication link 116 may comprise a wireless connection in which one of the following wireless communication protocols may be used: WLAN (IEEE 802.11x), Bluetooth, or any other type of wireless communication protocol. The computing device 112 may comprise any type of computer, portable wireless computing device, or any kind of computing device comprising a processor and memory which is capable of executing firmware and/or software. In another embodiment, several computing devices 112 may be used in parallel to process the captured image provided by the camera 104. The computing device 112 is communicatively coupled to the local area network (LAN) 124 by way of a wireline or wireless connection 126. The wireline connection may comprise a IEEE 802.3xx connection and the wireline connection may comprise a IEEE 802.11xx connection, for example. The LAN 124 may comprise one or more other computing devices (not shown) which, in cooperation with the computing device 112, may be used to process the images output by the camera 104. The one or more other computing devices may perform parallel processing of the video data provided by the captured images. The computing device 112 may be communicatively coupled to the LAN 124. The computing device may also be communicatively coupled to the WAN 128. The LAN 124 may comprise a router (not shown) for routing and switching data packets associated with an exemplary 802.3xx communication protocol. The WAN 128 may be connected to the Internet 120 by way of a modem or gateway (not shown), for example. The Internet 120 may be owned and operated by one or more Internet Service Providers (ISP) or telecommunications carriers. While not shown in FIG. 1A, the video data transmitted from the camera and processed by the computing device 112 travels through the Internet 120 to one or more receiving parties or clients. The one or more receiving parties may receive the video data using their own respective modems or gateways and the video data may be appropriately processed and displayed at each party's respective display/television/monitor.

As shown in FIG. 1A, the participants 136 of the video-conference are situated around the conference room table 132. There are a total of five participants (labeled 1, 2, 3, 4, and P) in this exemplary embodiment. The presenter (labeled P) is at one end of the conference room table as shown. In this embodiment, the camera 104 is positioned such that it faces the participants 136 as they view the display 140.

Therefore, typical headshots captured by the camera 104 for this exemplary operating environment may appear as shown in FIG. 1B.

FIG. 1B illustrates a field of view from a camera's perspective in accordance with the exemplary operating environment shown in FIG. 1A. The field of view illustrates the image captured by the camera previously described in connection with FIG. 1A. From the camera's perspective, objects closer to it will be larger while objects further away will be smaller. Therefore, participants 2 and 3 appear larger to the camera than participants 1 and 4. The presenter, P, sitting at the far end of the conference room table 132 appears smallest to the camera. As a consequence, the facial images of participants 2 and 3 may be larger than the facial images of participants 1 and 4. The participant situated furthest from the camera 140, such as participant P, may have the smallest facial image, from the perspective of the camera 140.

FIG. 1C illustrates the recognition or detection of facial images within the image captured by the camera in accordance with the illustrative operating environment shown in FIG. 1A. The computing device 112 shown in FIG. 1A may be configured to execute an algorithm that identifies, tracks, and collects facial images while disregarding or discarding non-facial images. A participant's face may be identified using typical facial features of a person. For example, the computing device 112 may execute an algorithm that recognizes various facial features to determine where the center of a participant's face is located in the camera's field of view. As illustrated, the computing device 112 is able to execute an algorithm such as a facial recognition algorithm that recognizes or detects the participants' facial images from in the camera's captured image. The facial recognition algorithm may be used to analyze any distinguishing facial features provided by the captured image. For example, the relative locations of various facial features (i.e., location of eyes, nose, ears, lips) may be used to determine the spatial area to be cropped that incorporates the facial image. Each of one or more facial images may be detected and sequentially positioned from left to right as illustrated in FIG. 1C. Each of these facial images may be tracked by the facial recognition algorithm. The algorithm may determine, isolate, and capture one or more regions that include one or more facial images captured by the camera. The facial recognition algorithm might not be employed for every frame. When the location of a facial image has been determined in the camera's field of view, the facial recognition algorithm may be placed in an idle state until it is determined that the facial image has moved. For example, the algorithm may be invoked when the participant moves or when facial features change. The participant may move from one seat to another, for example. The facial recognition algorithm may be configured to track the movements of the participant so that the facial image may be captured and eventually extracted.

FIG. 1D illustrates facial images of participants 136 after their facial images have been normalized in accordance with the exemplary operating environment shown in FIG. 1A. As illustrated, the facial images that have been recognized and detected in FIG. 1C are normalized in size by the computing device 112. The computing device 112 may execute a facial recognition algorithm that normalizes or resizes the facial images so that they are presented to a receiver at approximately the same size. The normalization may be accomplished by resizing the width and/or height of the facial image. Normalization may occur by way of horizontal scaling which may be accomplished by displaying one of two pixels when processing the image horizontally. Likewise, normalization may occur by way of vertical scaling which may be performed by skipping every other horizontal scan row during video processing of a captured facial image. The normalization may allow each of the facial images to be properly displayed within a viewport. A viewport may be defined as a rectangular region which includes a person's normalized facial image. The rectangular region may be defined by using Cartesian coordinates (e.g., X and Y coordinates).

FIG. 1E illustrates collating and/or sorting of normalized facial images of participants 136 in accordance with the exemplary operating environment shown in FIG. 1A. For example, the normalized facial images may be reordered or reorganized by the participants' last names or by any other parameters.

FIG. 1F illustrates the positioning or arranging of normalized facial images of participants 136 into an output grid pattern in accordance with the exemplary operating environment shown in FIG. 1A. The output grid pattern shown is transmitted from the host by way of control using the computing device 112 to one or more clients or other parties participating in the videoconference call. As illustrated, participant P (i.e., the presenter) is positioned in the center of the grid pattern so that the one or more other parties participating in the videoconference may easily focus their attention to the presenter. The facial images of the participants 136 may be arranged in any pattern desired. The resolution (number of pixels) per viewport may be determined based on the number of viewports to be transmitted to the client and the available bandwidth (between the host and each of the clients). As the number of viewports transmitted increases, the bandwidth requirements increase, which requires the resolution to be decreased per viewport if the bandwidth is fixed. Therefore, for a given bandwidth, the resolution per viewport (image resolution) decreases as more facial images are transmitted.

FIG. 2A illustrates an example operating environment in which various aspects of the disclosure may be implemented. The operating environment includes one or more persons/participants 236, sitting around a conference room table 232, a number of cameras 204, 205, 206, a computing device 212, a local area network 224 communicatively coupled to a wide area network 228, and an Internet 220. The exemplary embodiment illustrates a top view of the operating environment. The cameras 204, 205, 206 may be positioned at evenly spaced locations in a room as shown. The cameras 204, 205, 206 may be communicatively coupled together either by way of a hardwired connection or by way of a wireless connection. The cameras 204, 205, 206 may communicate by using any one of a number of protocols. While not shown in FIG. 2A, the cameras 204, 205, 206 may be networked into a hub which is communicatively coupled to the computing device 212. For example, the cameras 204, 205, 206 may communicate using a version of the USB protocol, an Ethernet protocol, or any other hardwired communications protocol. In another example, the cameras 204, 205, 206 may communicate using a wireless protocol such as the IEEE 802.11xx or Bluetooth protocol.

The cameras 204, 205, 206 are communicatively coupled to the computing device 212 by way of a communication link 216. The communication link 216 may comprise a wired connector which may be configured to transmit and receive signals that comply with the following hard-wired protocols: versions of USB, Firewire (IEEE 1394), Ethernet (versions of IEEE 802.3), or any other wired protocol. Alternatively, the communication link 216 may comprise a wireless connection in which one of the following wireless communication protocols may be used: WLAN (IEEE 802.11x), Bluetooth, or any other type of wireless communication protocol. The computing device 212 may comprise any type of computer, portable wireless computing device, or any kind of computing device comprising a processor and memory which is capable of executing firmware and/or software. In another embodiment, several computing devices 212 may be used in parallel to process the captured image provided by the cameras 204, 205, 206. The computing device 212 is communicatively coupled to the local area network (LAN) 224 by way of a wireline or wireless connection 226. The wireline connection may comprise IEEE 802.3xx and the wireline connection may comprise IEEE 802.11xx, for example. The LAN 224 may comprise one or more other computing devices (not shown) which may cooperatively process the images output by the cameras 204, 205, 206. The one or more other computing devices may perform parallel processing of the video data provided by the captured images. The computing device 212, which is part of the LAN 224, may be communicatively coupled to a wide area network (WAN) 228. The LAN 224 may comprise a router (not shown) for routing and switching data packets associated with an exemplary 802.3xx communication protocol. The WAN 228 may be connected to the Internet 220 by way of a modem or gateway (not shown), for example. The Internet 220 may be owned and operated by an Internet Service Provider (ISP) or telecommunications carrier. While not shown in FIG. 2A, the video data transmitted from the camera and processed by the computing device(s) 212 travels through the Internet 220 to one or more receiving parties or clients. The one or more receiving parties may receive the video data using their own respective modems or gateways and the video data may be appropriately processed and displayed at each party's respective display/television/monitor.

As shown in FIG. 2A, the participants 236 of the videoconference are situated around a round conference room table 232. There are a total of five participants (indicated as 1, 2, 3, 4, and P) in this exemplary embodiment. In this embodiment, the cameras 204, 205, 206 are positioned such that they face the participants 236 at different view angles allowing for different field of views. Each camera's field of view and angle of view may be adjusted to maximize the capture of as many of the participants' facial images in the room. The position of each camera may be adjusted to maximize the number of facial views of the participants as possible. Typical headshots captured and collected by the cameras 204, 205, 206 for this exemplary operating environment may appear as shown in FIG. 2B.

FIGS. 2B, 2C, and 2D illustrate views from the three cameras 204, 205, 206 in accordance with the exemplary operating environment shown in FIG. 2A. The computing device 212 shown in FIG. 2A is configured to execute a facial recognition algorithm that may identify, track, and collect facial images while disregarding or discarding non-facial images. A participant's face may be identified using typical facial features of a person. For example, the facial recognition algorithm may recognize various facial features to determine the location of the center of a participant's face in the camera's field of view. This location may be used to center the facial image within a viewport corresponding to a participant. The facial recognition algorithm may also be able to determine which participant is speaking by detecting and processing the lip movements of a participant. The facial recognition algorithm may consider continuous lip movements over a minimum period of time to correspond with speech. Each camera's field of view is illustrated in each of FIGS. 2B, 2C and 2D.

FIG. 2B illustrates the facial images collected from the image captured by the first camera 204 in accordance with the exemplary operating environment shown in FIG. 2A. While the image captured may comprise all five participants, the algorithm may select participants 3, 4, and P while it discards participants 1 and 2. Since participant P is closest to the camera 204, P appears larger than participants 3 and 4. The first camera 204 may discard those headshots, such as those corresponding with participants 1 and 2, which do not comprise some portion of a participant's face. For example, the facial recognition algorithm may discard a participant's image if at least a certain portion of a person's lips are not present.

FIG. 2C illustrates the facial images collected from the image captured by the second camera 205 in accordance with the exemplary operating environment shown in FIG. 2A. While the image captured may comprise all five participants, the algorithm selects participants 1, 4, and P while it discards participants 2 and 3. Since participants 1 and 4 are closest to the camera 205, they appear larger than participant P. The second camera 205 may discard those headshots, such as those corresponding with participants 2 and 3, which do not comprise some portion of a participant's face. For example, the facial recognition algorithm may discard a participant's image if at least a certain portion of a person's lips are not present.

FIG. 2D illustrates the facial images collected from the image captured by the third camera 206 in accordance with the exemplary operating environment shown in FIG. 2A. While the image captured may comprise all five participants, the algorithm selects participants 1, 2, and P while it discards participants 3 and 4. Since participant P is closest to the camera 206, it appears larger than either participants 1 or 2. The third camera 206 may discard those headshots, such as those corresponding with participants 3 and 4, which do not comprise some portion of a participant's face. For example, the facial recognition algorithm may discard a participant's image if at least a certain portion of a person's lips are not present.

The algorithm may pan, select, and crop headshot images which can provide at least a partial facial view of the participant. For example, the algorithm may select and collect only the headshot images which provide some portion of a participant's lips and at least one eye. The computing device 212 may be able to execute an algorithm that recognizes or detects the participants' facial images from the camera's captured image. The algorithm may be used to analyze any distinguishing facial features provided by the captured image. For example, the relative locations of various facial features (i.e., location of eyes, nose, ears, lips) may be used to determine the spatial area to be cropped as the eventually displayed facial image. Each of one or more facial images may be detected and sequentially positioned from left to right as illustrated in FIGS. 2E, 2F and 2G. By way of recognizing facial features, the computing device 212 may be able to determine the spatial region that comprises a participant's face. Each of the participant's facial image may be tracked by the algorithm. The algorithm may determine one or more regions in the captured image that corresponds to one or more of these facial images. Each of the one or more regions may be defined as a viewport. As previously described, the viewport may be defined as a rectangular capture region of a camera's field of view which includes a facial image of a particular participant. The viewport may be defined by using Cartesian coordinates.

The algorithm may be configured to discard a headshot image that does not contain an eye and/or a portion of a lip, or based on other specified criteria. The algorithm may compare a headshot to a database of images stored in a memory, drive, or any storage device of the computing device 212. The database may be updated as it receives additional images on a real time basis. The algorithm may be configured to lock onto a facial image and track the facial image should the participant move within the field of view of a camera.

The computing device 212 may execute an algorithm that normalizes or resizes the facial images so that they are presented to a receiver at approximately the same size. The normalization may be accomplished by resizing the width and/or height of the facial image. Horizontal scaling may be accomplished by displaying one of two pixels when processing the image horizontally. Likewise, vertical scaling may be performed by skipping every other horizontal scan row during video processing. The normalization may allow each of the facial images to be properly displayed within a viewport. Furthermore, normalizing the facial images allows for the presentation of facial images in standard sized viewports to the party receiving the videoconference. Other scaling techniques may alternatively be used.

FIG. 2E illustrates the normalization of the selected facial images captured by the first camera 204 in accordance with the exemplary operating environment shown in FIG. 2A. During the normalization process, the computing device 212 may selectively scale the facial images associated with each of participant 3 and participant 4 (shown on the left side of FIG. 2E) to match the facial image size of participant P. After normalization, the facial images of each of participants 3, 4, and P are the same size as shown in the right side of FIG. 2E.

FIG. 2F illustrates the normalization of the selected facial images captured by the second camera 205 in accordance with the exemplary operating environment shown in FIG. 2A. During the normalization process, the computing device 212 may selectively scale the facial images associated participant P (shown on the left side of FIG. 2F) to match the facial image size of each of participants 1 and 4. After normalization, the facial images of each of participants 1, 4, and P are the same size as shown in right side of FIG. 2F.

FIG. 2G illustrates the normalization of the selected facial images captured by the third camera 206 in accordance with the exemplary operating environment shown in FIG. 2A. During the normalization process, the computing device 212 may selectively scale the facial images associated with each of participant 1 and participant 2 (shown on the left side of FIG. 2G) to match the facial image size of participant P. After normalization, the facial images of each of participants 1, 2, and P are the same size as shown in the right side of FIG. 2G.

FIG. 2H illustrates sorting and processing of the facial images captured by each of the cameras 204, 205, 206 in accordance with the exemplary operating environment shown in FIG. 2A. The facial images of the selected participants 236 are collated after normalization to determine the number of facial images per participant that has been captured from the cameras 204, 205, 206. For example, there are two facial images to select from for participant 1, one facial image for participant 2, one facial image for participant 3, two facial images from participant 4, and three facial images from participant P. For each participant, the computing device 212 may select the preferred facial image for transmission from the host's computing device to the clients or other parties involved in the videoconference call. For example, one of the two facial images for participant 1, one of the two facial images for participant 4, and one of the three facial images for participant P are selected by the computing device 212 as preferred facial images. The computing device 212 may determine the preferred facial images using the facial recognition algorithm. The facial recognition algorithm may determine that the preferred image presents the best view of a person's lips and/or eyes, for example. In other embodiments, the facial recognition algorithm may determine a preferred image based on the resolution of each of the normalized facial images. The algorithm may determine that the image with the highest resolution is the preferred image. Since there is only one facial image available for each of participant 3 and participant 4, each of these images are selected for transmission to the clients. The set of preferred images (one for each participant) is eventually transmitted to the one or more clients.

FIG. 2I illustrates the positioning or arranging of the preferred images of participants 236 into spatial pattern in accordance with the exemplary operating environment shown in FIG. 2A. As shown the presenter is positioned in the middle of the participants because he is perceived to be the center of attention. The relative spatial positions may be incorporated into a grid or pattern. Each cell of the grid may comprise a viewport.

FIG. 2J illustrates the positioning or arranging of the preferred images of participants 236 into an output grid pattern in accordance with the exemplary operating environment shown in FIG. 2A. The foregoing presentation pattern or grid is transmitted from the host to the other one or more clients involved in the videoconference call. The pattern or grid may be determined by the computing device 212 to maximize functionality and improve communications to the other parties viewing the videoconference call. As illustrated, participant P (i.e., the presenter) is positioned at the center of the grid pattern so that the one or more other parties participating in the videoconference may easily focus their attention to the presenter. The output grid pattern shown is transmitted by the computing device 212 to one or more parties participating in the videoconference call. The preferred facial images of the participants 236 are arranged into a pattern or grid for display at each of the clients' monitors. The grid may be comprised of viewports arranged in spatial arrangement. For example, participant P, also known as the presenter, may be positioned at the center of the grid because attention may be focused on him, as shown in FIG. 2J. The preferred facial images of the participants 236 may also be positioned from left to right, top to bottom, based on any organizational parameter. For example, the facial images of the participants may be spatially organized based on participant's first or last names, by rank or importance, or by distance from a certain location in a room. The resolution per viewport may be determined based on the number of viewports to be transmitted to the client and the available bandwidth (between the host and each of the clients). As the number of viewports transmitted increases, the bandwidth requirements increase, which requires the resolution to be decreased per viewport if the bandwidth is fixed. Therefore, for a given bandwidth, the resolution per viewport (image resolution) decreases as more facial images are transmitted. The computing device 212 may be capable of identifying each participant that is speaking by way of monitoring the lip movements of each participant. The facial recognition algorithm may be used to monitor and track such lip movements of each participant.

Aspects of the disclosure provide that each of the one or more cameras' field of view may be adjusted to capture the appropriate number of facial images. For example, the algorithm may determine that a rear headshot image provides little or no value. Therefore, such an image might not be used and processed by the computing device. In one embodiment, the camera may capture and output video at a rate of 30 frames per second (fps). Since video processing typically consumes a considerable amount of central processing unit (CPU) resources, the processor of the computing device may execute one or more algorithms to update only those regions of the captured field of view which contain facial images. These regions or viewports may be identified by a camera number and a viewport number, for example. The viewport number may be used to identify a region, such as a rectangular region in the captured image which comprises the facial image of one of the one or more persons in the captured image. A camera number and viewport number may be used to identify a region of the captured image that comprises a facial image. After identifying each of one or more regions in the captured image that comprises a facial image, the processor in the computing device 112, 212 may only process pixels corresponding to each of these viewport regions as a way of conserving processing power and allowing the CPU to be used for other processing tasks.

The computing device 112, 212 may also implement a feature that signals that a particular participant is speaking. For example, the feature may include highlighting one or more portions of the viewport when the corresponding participant is speaking. The highlighting may include a flashing or blinking of the borders of a viewport corresponding to the participant that is doing the speaking. The background of the viewport containing the participant may be shaded in a particular color, for example, to signify that this participant is currently doing the speaking. Other visual indicators may be used to signify that a participant of a viewport is speaking. When more than one participant speaks, the corresponding visual indicators of each of the participants may be simultaneously active.

Aspects of the disclosure provide for a plurality of microphones situated in the room for determining which of the participants are currently speaking. The microphones may be spaced around a conference room table to differentiate which person is speaking. The intensity or amplitude of the received audio signal may be used to determine which person is speaking. An audio triangulation algorithm may be employed by a computing device (112 in FIG. 1A, 212 in FIG. 2A) to determine the location of the person doing the talking. The information or data generated from this audio triangulation algorithm may be used to supplement the facial recognition algorithm previously described. Therefore, use of the audio triangulation algorithm may be invoked by the computing device 112, 212 in the event the facial recognition algorithm cannot accurately determine who is speaking. For example, the facial recognition algorithm may be unable to determine which participant is speaking if the angle of view of the corresponding camera provides a side facial view of the participant. The corresponding camera may be unable to capture the entire lip area of a participant. Therefore, the facial recognition algorithm may be unable to determine the participant who is speaking based on lip movement. Thus, in this instance, the audio triangulation algorithm may be employed to determine which participant is doing the talking. The audio triangulation algorithm may be employed whenever the computing device 112, 212 determines it is necessary. The computing device 112, 212 may employ the use of a facial recognition threshold which triggers the deployment of the audio triangulation algorithm when lip movements are minimal or not visible for a particular participant. The facial recognition algorithm may be executed by way of a facial recognition engine resident in the computing devices 112, 212. The audio triangulation algorithm may be executed by way of an audio triangulation engine resident in the computing devices 112, 212. The facial recognition engine and the audio triangulation engine may be implemented as an executable software module in any computing device. Each of the facial recognition and audio triangulation algorithms might not be employed for each frame of the streaming video of a videoconference call. These algorithms may be employed as necessary. For example, after the location of a facial image has been determined and if the facial image remains stationary for a period of time, the facial recognition and audio triangulation algorithms may be deactivated. The algorithms may be invoked as necessary, for example, when a participant moves or when a facial feature, such as lip movement and/or eye movement, is detected or changed, for example.

FIG. 3 illustrates an example block diagram of a generic computing device 301 (e.g., any computing device incorporating the use of at least one processor and at least one memory) corresponding to each of the computing devices shown in connection with each of FIGS. 1A and 2A according to one or more embodiments of the disclosure. According to one or more aspects, generic computing device 301 may be a server in a single-server or multi-server desktop virtualization system (e.g., a cloud system) configured to provide virtual machines for client access devices. The generic computing device 301 may have a processor 303 for controlling overall operation of the server and its associated components, including random access memory (RAM) 305, non-volatile memory 307, input/output (I/O) module 309, and memory 315.

I/O module 309 may include a mouse, keypad, touch screen, scanner, optical reader, and/or stylus (or other input device(s)) through which a user of generic computing device 301 may provide input, and may also include one or more of a speaker for providing audio output and a video display device for providing textual, audiovisual, and/or graphical output. Software may be stored within memory 315 and/or other storage to provide instructions to processor 303 for enabling generic computing device 301 to perform various functions. For example, memory 315 may store software used by the generic computing device 301, such as an operating system 317, application programs 319, and an associated database 321. Alternatively, some or all of the computer executable instructions for generic computing device 301 may be embodied in firmware stored in the non-volatile memory 307. The non-volatile memory 307 may comprise read only memory (ROM), electrically erasable ROM, or flash memory, for example.

The generic computing device 301, which implements the host for transmitting the images in a videoconference call, may be communicatively coupled to other clients, via one or more telecommunication connections to one or more computing devices 340, 342. One or more of the computing devices 340 may be accessed via the WAN while the other one or more computing devices 342 may be accessed through a LAN. The computing devices 340, 342, may comprise a desktop computer, a laptop, mobile communication device, or any digital appliance that comprises at least one processor and at least one memory. The one or more computing devices 340, 342 may include many or all of the elements described above with respect to the generic computing device 301. The generic computing device 301 at the host may communicate to the one or more computing devices 340, 342 at the client(s). The network connections depicted in FIG. 3 include a local area network (LAN) 325 and a wide area network (WAN) 329, but may also include other networks (now shown). The generic computing device 301 may be connected to the LAN 325 through a network interface or adapter 323. The generic computing device 301 may include a modem 327 or other WAN network interface for establishing communications over the WAN 329, by way of the Internet 330. It will be appreciated that the network connections shown are illustrative and other means of establishing a communications link between the general computing device 301 and the one or more computing devices 340, 342 may be used. Generic computing device 301 and/or the one or more computing devices 340, 342 may also be mobile terminals (e.g., mobile phones, smartphones, PDAs, notebooks, and the like).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 3, one or more client devices 340, 342 may be in communication with the generic computing device 301 and one or more servers 306a-306n. In one embodiment, the computing environment 300 may include an appliance installed between the general computing device 301/server(s) 106 and client machine(s) 340, 342. This appliance can manage client/server connections, and in some cases can load balance client connections amongst a plurality of backend servers 306.

The client devices 340, 342 may in some embodiments be referred to as client machines or a single group of client machines, while server(s) 306 may be referred to as a single server or a single group of servers. In one embodiment, a single client machine (340 or 342) communicates with more than one server 306 and the generic computing device 301, while in another embodiment a single server 306 communicates with more than one client machine 340, 342. In yet another embodiment, a single client machine (340 or 342) communicates with a single server (one of 306a-n).

Each of the one or more client devices 340, 342 may, in some embodiments, be referenced by any one of the following terms: client machine(s); client(s); client computer(s); client device(s); client computing device(s); local machine; remote machine; client node(s); endpoint(s); or endpoint node(s). The servers 306, in some embodiments, may be referenced by any one of the following terms: local machines; remote machines; server farms, or host computing devices.

In one embodiment, each of the one or more client devices 340, 342 may comprise a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 306a-n or a hypervisor executing on one of the one or more clients 340, 342.

The client machine 340 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include one or more client devices 340, 342 that display an application output generated by an application remotely executing on a generic computing device 301 and/or servers 306. In these embodiments, the client devices 340, 342 may execute a virtual machine receiver program or application to display the output in an application window, a browser, or other output window. In one example, the application is executed on a desktop, while in other examples the application is an application that generates a desktop view. A desktop view may include a graphical shell providing a user interface for an instance of an operating system in which local and/or remote applications can be integrated. Applications, as used herein, are programs that execute after an instance of an operating system (and, optionally, also the desktop) has been loaded.

The one or more generic computing device 301 and/or servers 306, in some embodiments, may execute a remote presentation client or other client or program that uses a thin-client or remote-display protocol to capture display output generated by an application executing on the one or more generic computing device 301 and/or servers 306 and transmits the application display output to the one or more remote clients 340, 342. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment may include a plurality of servers 106a-106n such that the servers may be logically grouped together into a server farm, for example, in a cloud computing environment. The server farm can include servers that are geographically dispersed and logically grouped together, or servers that are located proximate to each other and logically grouped together. Geographically dispersed servers 106a-106n within a server farm may, in some embodiments, communicate using a WAN, MAN, or LAN, where different geographic regions may be characterized as: different continents; different regions of a continent; different countries; different states; different cities; different campuses; different rooms; or any combination of the preceding geographical locations. In some embodiments the server farm may be administered as a single entity, while in other embodiments the server farm may include multiple server farms.

In some embodiments, a server farm may include servers 306 that execute a substantially similar type of operating system platform (e.g., WINDOWS NT, manufactured by Microsoft Corp. of Redmond, Wash., UNIX, LINUX, or SNOW LEOPARD.) In other embodiments, the server farm may include a first group of servers that execute a first type of operating system platform, and a second group of servers that execute a second type of operating system platform. The server farm, in other embodiments, can include servers that execute different types of operating system platforms.

The one or more servers 306, in some embodiments, may be any server type. In other embodiments, the one or more servers 306 may be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality. Some embodiments include a first server 306a that receives requests from a client machine 340, 342, forwards the request to a second server 306b-n, and responds to the request generated by the client device 340, 342 with a response from the second server 306b-n. The first server 306a can acquire an enumeration of applications available to one of the client machines 340, 342 and well as address information associated with an application server of the servers 306 hosting an application identified within the enumeration of applications. The first server 306a can then present a response to the client's request using a web interface, for example, and communicate directly with one or more of the clients 340, 342 to provide the one or more clients 340, 342 with access to an identified application.

Client devices 340, 342 may, in some embodiments, be a client node that seeks access to resources provided by the servers 306. In other embodiments, the servers 306 may provide clients 340, 342 or client nodes with access to hosted resources. The servers 306, in some embodiments, functions as a master node such that the master node communicates with one or more clients 340, 342. In some embodiments, the master node can identify and provide address information associated with a server (of the one or more servers 306) that hosts a requested application, to one or more clients 340, 342 and/or servers 306. Yet, in other embodiments, the master node can be a server farm, a client 340, 342, a cluster of client nodes, or an appliance.

One or more clients 340, 342 and/or one or more servers 306 may transmit data over the Internet 130 as shown in FIG. 3. The WAN 329 and/or LAN 325 may comprise one or more sub-networks, and can be implemented using any combination of the clients 340, 342, servers 306, computing device(s) 301, and digital appliances included within the computing environment 300. The Internet 330 may be implemented using any combination of the following network types: ATM (Asynchronous Transfer Mode); SONET (Synchronous Optical Network); SDH (Synchronous Digital Hierarchy); wireless; and/or wireline. The network topology of the WAN 329 and LAN 325 may differ within different embodiments, and possible network topologies include but are not limited to: a bus network topology; a star network topology; a ring network topology; a repeater-based network topology; or a tiered-star network topology. Additional embodiments may include mobile telephone networks that use a protocol to communicate among mobile devices, where the protocol may include, but is not limited to: AMPS; TDMA; CDMA; GSM; GPRS; UMTS; LTE; WiMAX; EDGE, or any other protocol capable of transmitting data to and from mobile devices.

FIG. 4 is an operational flow diagram illustrating how one or more cameras, at a host, capture, process, and transmit one or more participants' facial images to a client in accordance with an embodiment of the disclosure.

At step 404, one or more cameras are used to capture an image including one or more participants in a room. The one or more participants in the room may be conducting a videoconference call, for example, with one or more other parties located at another location in another room. The one or more other parties may comprise members of another firm or company, for example. In one embodiment, a single camera may be placed in front of the persons or participants when the persons or participants are facing the front of a room. The camera may be positioned on top of a display or monitor, for example. In another embodiment, the one or more cameras may be placed at different locations of a room to obtain different field of views of the one or more participants in the room. For example, the one or more cameras may be strategically placed at different sides or corners of the room to attain different camera angles of the participants' faces in the room.

Next, at step 408, the one or more cameras output the captured images to a computing devices used for detecting, identifying, selecting, and extracting one or more captured facial images associated with the one or more participants in the room. The computing device receives any images captured by the one or more cameras. The one or more cameras may be communicatively coupled using a hub or switch. The one or more cameras may be connected via the hub or switch to the computing device using any type of wired or wireless protocol. The computing device may execute one or more algorithms for processing the captured images. The one or more algorithms may comprise a facial recognition algorithm or an audio triangulation algorithm as was previously described in this disclosure. The facial recognition algorithm may identify and track a participant's face by way of recognizing one or more facial features of a person. The one or more facial features may comprise one or more eyes, hair, head, nose, lips, ears, moustache, and/or beard. The facial recognition algorithm may also be programmed to analyze and recognize clothing such as scarves, earrings, necklaces, hats, and other types of items worn by a person. By recognizing such features and/or items, the facial recognition algorithm can identify the center of a person's face and determine the appropriate region of the image to track and extract. Since the person's face may be stored after being identified, the facial recognition algorithm of the computing device may continuously track the face should the face move within the camera's field of view. The region may comprise standardized rectangular regions called viewports. Each viewport may contain a facial image of a participant. A facial image may be extracted and superimposed on a viewport containing a suitable background image. A preferable background image may be determined based on the brightness, contrast, and resolution of the facial image extracted. The background may be selectable by a user or may be automatically generated by execution of the facial recognition algorithm module by a processor of the computing device. The computing device may perform frame refreshes or updates only these viewport regions, as opposed to updating an entire captured image, allowing the processor of the computing device to conserve processing power for other needed tasks. The facial recognition algorithm may also be employed to determine which participant is speaking. After identifying and tracking each facial image, the facial recognition algorithm may analyze each facial image for lip movement. The facial recognition algorithm may determine that lip movements of certain duration constitute speech. Therefore, the facial recognition algorithm may determine that one or more participants are speaking. When, a participant's facial image includes only a portion of a lip and it is difficult to ascertain whether a participant is speaking or not, the computing device may invoke the execution of an audio triangulation algorithm. The audio triangulation algorithm may employ the use of a microphone system in which a plurality of microphones are circularly positioned and aligned at various seat locations around a videoconference room table, for example. Each of the one or more microphones may be used to determine an angle and an amplitude or intensity of an audio signal it receives. The audio signal may comprise an utterance of words from a participant. The audio signal generated from each of these microphones may be used by the computing device to determine the location of the utterance, thereby the location of the participant. Thus, the audio triangulation algorithm may determine which of the one or more persons is speaking. Each of the facial recognition algorithm and the audio triangulation algorithm may be invoked by executing software stored in the memory of the one or more computing devices described in connection with each of FIGS. 1A and 2A. The memory may comprise a hard disk drive, for example.

Next, at step 412, the computing device may normalize the one or more extracted facial images into a standardized size for presentation over a viewport. The viewport may comprise a rectangle having a particular size. The size of the viewport may be determined by the facial recognition algorithm based on the facial images captured by the one or more cameras. The size of the viewport may be based on the resolution of the facial images captured.

At step 416, the one or more normalized facial images captured by each camera may be evaluated for each participant. After all normalized facial images for a participant are collected for each frame time (or period), the preferred (or best) facial image is selected for each participant by the facial recognition algorithm. The preferred facial image selected for each participant may be based on one or more factors. The quality of each of the normalized facial images for each participant may be assessed. For example, the angle of view of the camera relative to the participant, the resolution of the facial image, lighting and shadows cast on the participant, may all be factors which are considered when the facial recognition algorithm selects a particular facial image. In some aspects, each of the normalized facial images may be compared to a high resolution control image. The normalized facial image that is closest to the control image may be selected as the preferred image.

Thereafter, at step 420, the preferred facial images are sorted and organized into a logical order for presentation onto a display or monitor. The preferred facial images may be presented as a grid pattern using a plurality of viewports. Each of the selected normalized facial images may be presented using a standard sized viewport. The size of a viewport may be determined based on the number of preferred facial images to be sent to the one or more clients. When the number of preferred facial images is large, the size of the viewports may decrease. The preferred facial images may be sorted based on a person's first or last name, a person's rank or title, importance with regard to the subject of the videoconference, or any other factor. The main presenter of a videoconference call may be positioned at the center of a grid or pattern so that he is the center of attention when he is displayed on a client's monitor. The viewports associated with the preferred facial images may also be organized from left to right and from top to bottom on the grid based on any organizational factor or parameter.

Next, at step 424, the preferred facial images are transmitted to the one or more clients participating in the videoconference call. Each of the one or more clients may utilize a display server for receiving and displaying the preferred facial images on a monitor. In one embodiment, the preferred facial images are transmitted as presented in the grid pattern shown in FIG. 2J, for example. The presenter, P, is positioned at the center of the grid while the other participants (participants 1-4) surround him. The preferred facial images are received by a client's computing device and displayed at the client's monitor.

The foregoing presents a simplified summary of the disclosure in order to provide a basic understanding of some aspects. It is not intended to identify key or critical elements of the invention or to delineate the scope of the invention. Although not required, one of ordinary skill in the art will appreciate that the various aspects described herein may be embodied as a method, a computer system, or as a computer-readable medium for storing computer-executable instructions that are capable of being executed by a processor of a computer system. Aspects of the invention have been described in terms of illustrative embodiments thereof. Numerous other embodiments, modifications, and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure. While some embodiments have been described with respect to specific examples, other embodiments include numerous variations and permutations of the above described systems and techniques.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A system comprising:
   one or more cameras; and
   a device configured to be connected to the one or more cameras, the device comprising one or more processors and memory storing instructions that, when executed by one of the processors, cause the device to:
   obtain, from at least one of the cameras, a set of images of a plurality of individuals at a location,
   select, from the set of images, for each individual, a preferred facial image for the individual,
   determine whether lip movement of one of the individuals is visible in the set of images, and
   select, based on whether lip movement of one of the individuals is visible in the set of images, at least one of a facial recognition algorithm and an audio triangulation algorithm to determine which individual is speaking;
   wherein the instructions, when executed by one of the processors, further cause the device to provide a graphical window which is rendered on a display, the graphical window including multiple viewports, the graphical window being divided into a grid pattern, each viewport of the multiple viewports residing in a respective location of the grid pattern and including a facial image for an individual, the graphical window further including viewport highlighting which highlights viewports corresponding to individuals that are speaking.

2. The system of claim 1, wherein:
the viewport highlighting comprises flashing of one or more viewport borders.

3. The system of claim 1, wherein:
the viewport highlighting comprises shading a background of one or more viewport portions.

4. The system of claim 1, wherein:
the instructions, when executed by one of the processors, cause the device to:
determine that multiple individuals are speaking simultaneously, and
cause multiple viewports that present facial images of the multiple individuals to provide indications that the multiple individuals are speaking.

5. The system of claim 1, wherein:
determining whether lip movement of one of the individuals is visible in the set of images comprises determining whether a lip area of the individual is visible in the set of images.

6. The system of claim 1, wherein:
the set of images comprises video of the individuals participating in a videoconference at the location.

7. A device comprising:
one or more processors; and
memory storing instructions that, when executed by one of the processors, cause the device to:
obtain, from at least one camera, a set of images of a plurality of individuals at a location,
select, from the set of images, for each individual, a preferred facial image for the individual,
determine whether lip movement of one of the individuals is visible in the set of images, and
select, based on whether lip movement of one of the individuals is visible in the set of images, at least one of a facial recognition algorithm and an audio triangulation algorithm to determine which individual is speaking;
wherein the instructions, when executed by one of the processors, further cause the device to provide a graphical window which is rendered on a display, the graphical window including multiple viewports, the graphical window being divided into a grid pattern, each viewport of the multiple viewports residing in a respective location of the grid pattern and including a facial image for an individual, the graphical window further including viewport highlighting which highlights viewports corresponding to individuals that are speaking.

8. The device of claim 7, wherein:
the viewport highlighting comprises flashing of one or more viewport borders.

9. The device of claim 7, wherein:
the viewport highlighting comprises shading a background of one or more viewport portions.

10. The device of claim 7, wherein:
the instructions, when executed by one of the processors, cause the device to:
determine that multiple individuals are speaking simultaneously, and
cause multiple viewports that present facial images of the multiple individuals to provide indications that the multiple individuals are speaking.

11. The device of claim 7, wherein:
determining whether lip movement of one of the individuals is visible in the set of images comprises determining whether a lip area of the individual is visible in the set of images.

12. The device of claim 7, wherein:
the set of images comprises video of the individuals participating in a videoconference at the location.

13. A non-transitory computer-readable medium storing instructions, that when executed by a processor of a device, cause the device to:
obtain, from at least one camera, video of a plurality of individuals participating in a video conference,
select, from the video, for each individual, a preferred facial image for the individual,
determine whether lip movement of one of the individuals is visible in the video, and
select, based on whether lip movement of one of the individuals is visible in the video, at least one of a facial recognition algorithm and an audio triangulation algorithm to determine which individual is speaking;
wherein the instructions, when executed, further cause the device to provide a graphical window which is rendered on a display, the graphical window including multiple viewports, the graphical window being divided into a grid pattern, each viewport of the multiple viewports residing in a respective location of the grid pattern and including a facial image for an individual, the graphical window further including viewport highlighting which highlights viewports corresponding to individuals that are speaking.

14. The computer-readable medium of claim 13, wherein:
the viewport highlighting comprises shading a background of one or more viewport portions.

15. The computer-readable medium of claim 13, wherein:
determining whether lip movement of one of the individuals is visible in the video comprises determining whether a lip area of the individual is visible in the video.

16. A method of managing a videoconference which includes multiple participants, the method comprising:
for each participant of the videoconference, selecting a preferred video feed that includes that participant from a respective set of video feeds that include that participant;
for each participant of the videoconference, extracting a series of facial images of that participant from the selected preferred video feed that includes that participant; and
provide a graphical window which is rendered on a display, the graphical window including multiple viewports, the graphical window being divided into a grid pattern, each viewport of the multiple viewports residing in a respective location of the grid pattern and including one of the series of facial images extracted for a particular participant, the graphical window further including viewport highlighting which highlights viewports corresponding to participants that are speaking.

17. A method as in claim 16, further comprising:
identifying exactly one participant that is speaking based on (i) detected lip movement and (ii) audio triangulation; and
wherein the viewport highlighting highlights exactly one viewport which corresponds to the exactly one participant that is speaking.

18. A method as in claim 16, further comprising:
based on (i) detected lip movement and (ii) audio triangulation, identifying a first participant and a second participant that are simultaneously speaking; and wherein the viewport highlighting concurrently highlights (i) a first viewport which corresponds to the first participant and (ii) a second viewport which corresponds to the second participant, the first viewport and the second viewport residing in different locations of the grid pattern.

* * * * *